(12) United States Patent
Pearl

(10) Patent No.: US 8,799,861 B2
(45) Date of Patent: Aug. 5, 2014

(54) PERFORMANCE-TESTING A SYSTEM WITH FUNCTIONAL-TEST SOFTWARE AND A TRANSFORMATION-ACCELERATOR

(75) Inventor: Michael Pearl, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1168 days.

(21) Appl. No.: 12/022,322

(22) Filed: Jan. 30, 2008

(65) Prior Publication Data
US 2009/0192761 A1 Jul. 30, 2009

(51) Int. Cl.
*G06F 9/44* (2006.01)
(52) U.S. Cl.
USPC .......................................... 717/124
(58) Field of Classification Search
None
See application file for complete search history.

(56) References Cited

U.S. PATENT DOCUMENTS

| | | | |
|---|---|---|---|
| 7,334,178 B1* | 2/2008 | Aulagnier | 714/758 |
| 2004/0143819 A1* | 7/2004 | Cheng et al. | 717/125 |
| 2006/0236224 A1* | 10/2006 | Kuznetsov et al. | 715/513 |
| 2007/0156420 A1* | 7/2007 | Meier et al. | 705/1 |

* cited by examiner

*Primary Examiner* — Li B Zhen
*Assistant Examiner* — Lenin Paulino
(74) *Attorney, Agent, or Firm* — Park, Vaughan, Fleming & Dowler LLP

(57) ABSTRACT

One embodiment of the present invention provides a system that facilitates testing a system-under-test with functional-test software and a transformation accelerator. During operation, the system receives a functional-test template at the transformation accelerator. The system also receives a test signal at the transformation accelerator, wherein the test signal comprises testing parameters. Next, the system manipulates the functional-test template at the transformation accelerator according to the testing parameters to create one or more functional-test transactions. The system then sends the one or more functional-test transactions to the system-under-test. Next, the system receives results for the one or more functional-test transactions from the system-under-test. Finally, the system queues the results.

21 Claims, 4 Drawing Sheets

PERFORMANCE-TESTING A SYSTEM WITH FUNCTIONAL-TEST SOFTWARE AND A TRANSFORMATION-ACCELERATOR

RELATED ART

In order to survive in today's marketplace, organizations need to thoroughly stress-test their web-based applications before placing them in a "live" environment. This stress-testing is critically important because a system failure due to high demand can result in negative consumer reactions, public relations disasters, and many other potentially detrimental situations. By stress-testing these applications beforehand, system administrators can identify system bottlenecks and potential sources of failure, which enables them to proactively deal with problems before they arise.

In order to stress-test transactional systems, system administrators often use functional test software, such as Borland® SilkTest®, to create functional tests, and then attempt to scale these functional tests to performance-test loads which simulate large numbers of concurrent users. However, this approach can be extremely expensive, and in many cases, is cost-prohibitive.

Moreover, in many situations, it is nearly impossible to reuse functional test cases to generate high-load traffic at the scale which is required to effectively test the system without writing specialized performance-driving test cases. Performance testing software, such as Borland® SilkPerformer®, while specifically built for such purposes, often cannot re-use test cases designed for functional testing software.

Another problem with traditional commercial performance testing software products in using them for stress-testing systems is that they typically analyze the results of each transaction as the results are received at the system. This type of analysis is computationally intensive, and this computational load can effectively limit the capacity of the stress-testing system as well as limit the duration of tests.

Furthermore, with the ever-increasing performance of microprocessors, and the higher throughput of transactional-based systems, it can be extremely difficult to generate the number of tests required to "break" the system under test, even with advanced computing clusters.

SUMMARY

One embodiment of the present invention provides a system that facilitates testing a system-under-test with functional-test software and a transformation accelerator. During operation, the system receives a functional-test template at the transformation accelerator. The system also receives a test signal at the transformation accelerator, wherein the test signal comprises testing parameters. Next, the system manipulates the functional-test template at the transformation accelerator according to the testing parameters to create one or more functional-test transactions. The system then sends the one or more functional-test transactions to the system-under-test. Next, the system receives results for the one or more functional-test transactions from the system-under-test. Finally, the system queues the results.

In some embodiments of the present invention, the system receives a functional-test-template transaction at the transformation accelerator. Next, the system forwards the functional-test-template transaction to the system-under-test. The system then receives a functional-test-template result for the functional-test-template transaction from the system-under-test. Finally, the system uses the functional-test-template transaction and the functional-test-template result to create the functional-test template.

In some embodiments of the present invention, the functional-test-template transaction is received from a user.

In some embodiments of the present invention, the functional-test-template transaction is received from a process that analyzes an input of a user to the system-under-test.

In some embodiments of the present invention, the functional-test-template transaction is received from a process that analyzes network traffic to the system-under-test.

In some embodiments of the present invention, the transformation accelerator is an eXtensible Markup Language (XML) accelerator.

In some embodiments of the present invention, manipulating the functional-test template at the transformation accelerator involves filling the functional-test template with data from a generic source to create the one or more functional-test transactions.

In some embodiments of the present invention, the system analyzes the queued results to determine a performance of the system-under-test.

In some embodiments of the present invention, the system records a response time from the system-under-test for each of the one or more functional-test transactions. The system then queues the response times.

In some embodiments of the present invention, the system analyzes the queued results with the queued response times to determine a performance of the system-under-test.

In some embodiments of the present invention, the system receives a set of transformation rules governing the functional-test template at the transformation accelerator. The system then uses the set of transformation rules to generate a series of test signals representing a complex workload without generating full transaction requests.

DETAILED DESCRIPTION

Figure 1:
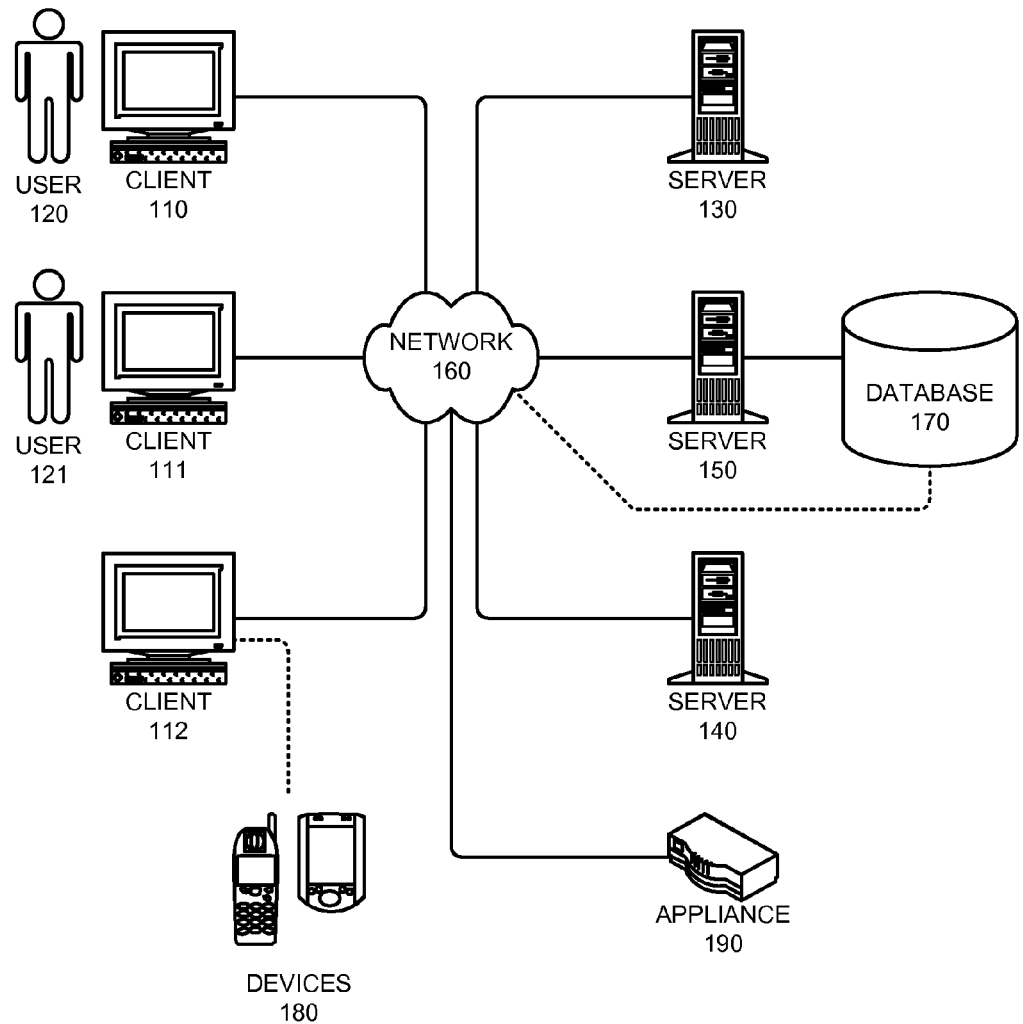
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a system that facilitates testing a system-under-test with functional-test software and a transformation accelerator. During operation, the system receives a functional-test template at the transformation accelerator. The system also receives a test signal at the transformation accelerator, wherein the test signal comprises testing parameters. Note that these testing parameters may include the name of the functional-test template, as well as a number of times to process the functional-test template, and may also specify a named set of pre-defined rules by which to vary the template. Next, the system manipulates the functional-test template at the transformation accelerator according to the testing parameters to create one or more functional-test transactions. The system then sends the one or more functional-test transactions to the system-under-test. Next, the system receives results for the one or more functional-test transactions from the system-under-test. Finally, the system queues the transformed requests and results for later analysis.

In some embodiments of the present invention, the system receives a functional-test-template transaction at the transformation accelerator. Next, the system forwards the functional-test-template transaction to the system-under-test. The system then receives a functional-test-template result for the functional-test-template transaction from the system-under-test. Finally, the system uses the functional-test-template transaction and the functional-test-template result to create the functional-test template. Note that this process is beneficial because it facilitates creating a benchmark result for each functional-test transaction for subsequent performance analysis of the system-under-test.

In some embodiments of the present invention, the functional-test-template transaction is received from a user. For example, a programmer or a system administrator may hand-code the functional-test template.

In some embodiments of the present invention, the functional-test-template transaction is received from a process that analyzes an input of a user to the system-under-test. For example, a process may capture the actions of a user interacting with the system-under-test during normal operation to recreate functional-test templates from actual transactions performed by the user.

In some embodiments of the present invention, the functional-test-template transaction is received from a process that analyzes network traffic to the system-under-test. For example, a process may capture the network traffic between a client and the system-under-test, while a user is using the system-under-test during normal operations, to recreate functional-test templates from actual transactions performed by the user.

In some embodiments of the present invention, the transformation accelerator is an eXtensible Markup Language (XML) accelerator. For example, the transformation accelerator may be an IBM® WebSphere® DataPower XML Accelerator.

In some embodiments of the present invention, manipulating the functional-test template at the transformation accelerator involves filling the functional-test template with data from a generic source to create the one or more functional-test transactions. Note that the generic source can include any source capable of supplying the transformation accelerator with "dummy data." For example, the generic source could comprise a database of United States Census data. The generic source could also include a repository of previous transactions performed on the system-under-test.

Note that in most cases, the specific data is not as important as randomizing the data over many transactions to provide a robust set of transactions which is similar to what the system-under-test may encounter during heavy operation.

In an exemplary embodiment of the present invention, by using an eXtensible Stylesheet Language Transformation (XSLT) accelerating network appliance, the system may define a re-entrant set of endpoints that allow a "multiplier" effect on transactions sent through the appliance. In this example, a single-threaded functional test suite could be used to generate load, or a multi-threaded performance suite could be used without clustering multiple performance test drivers.

Note that the XML/XLST accelerator(s) may appear to be completely transparent to the test driver, which still thinks it sent only one message and received only one response. However, because of the appliance, a large number of transactions are actually executed in parallel, and request/response sets are asynchronously stored for later analysis.

In one embodiment of the present invention, the system comprises two "layered" domains in the XML/XSLT accelerator. The first domain encapsulates the original message in an XML document, and adds "repeat" parameters based on the initial endpoint or names of pre-defined rules that the client sets in the test request. The second domain executes the request across multiple destinations in parallel, including possibly looping back recursively through the request for an increased multiplier effect.

Note that, in this embodiment, the second domain is responsible for varying data elements through usual enrichment, such as grabbing new names, addresses, and credit card numbers from external services to vary the test case input data. The second domain then puts the responses it receives into an asynchronous message broker so that the responses can be analyzed, either during or after the test, to ensure functional correctness without slowing the test execution.

In some embodiments of the present invention, the system receives a set of transformation rules governing the functional-test template at the transformation accelerator. The system then uses the set of transformation rules to generate a series of test signals representing a complex workload without generating full transaction requests. Note that this can greatly reduce the overhead of the testing system and also provide for reuse of test signal profiles across different complex workloads for different systems-under-test. For example, a test profile representing a 5-day on/2-day off workweek for an internal accounting system can be reused for an otherwise unrelated system, such as for an online trading application with 5-trading days/2-day weekend. The system and scripts generating the signals received by transformation accelerator can be highly reusable components, with key variances controlled by predefined rules.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network.

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different configurations, and are not limited to the configuration illustrated in computing environment 100.

Testing Environment

Figure 2:
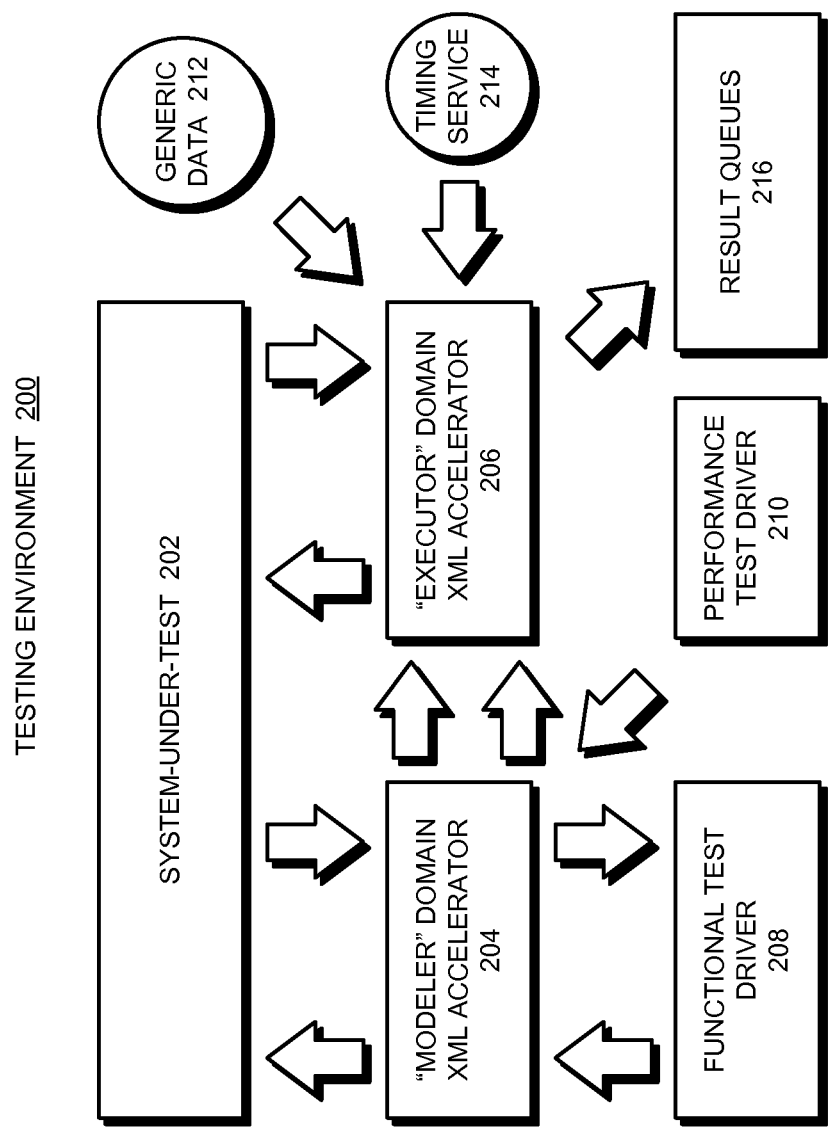
FIG. 2 illustrates a testing environment in accordance with an embodiment of the present invention.

FIG. 2 illustrates a testing environment 200 in accordance with an embodiment of the present invention. Testing environment 200 includes the system-under-test 202, "modeler" domain XML accelerator 204, "executor" domain XML accelerator 206, functional test driver 208, performance test driver 210, generic data 212, timing service 214, and result queues 216. Functional test driver 208 may include any software testing application capable of creating a functional test for system-under-test 202.

Note that "modeler" domain XML accelerator 204 and "executor" domain XML accelerator 206 may reside on the same XML accelerator or on different XML accelerators. Also note that these XML accelerators translate data from one format to another at "wire" speeds. For example, in one embodiment of the present invention, the XML accelerator uses an eXtensible Stylesheet Language Transformation (XSLT) to transform plain text originating from the functional test driver 208 to XML in the form expected by system-under-test 202. Also note that any type of accelerator and any type of transformation may be used with embodiments of the present invention. XML is used for illustrative purposes only, and embodiments of the present invention are not meant to be limited to the use of XML.

Figure 3:
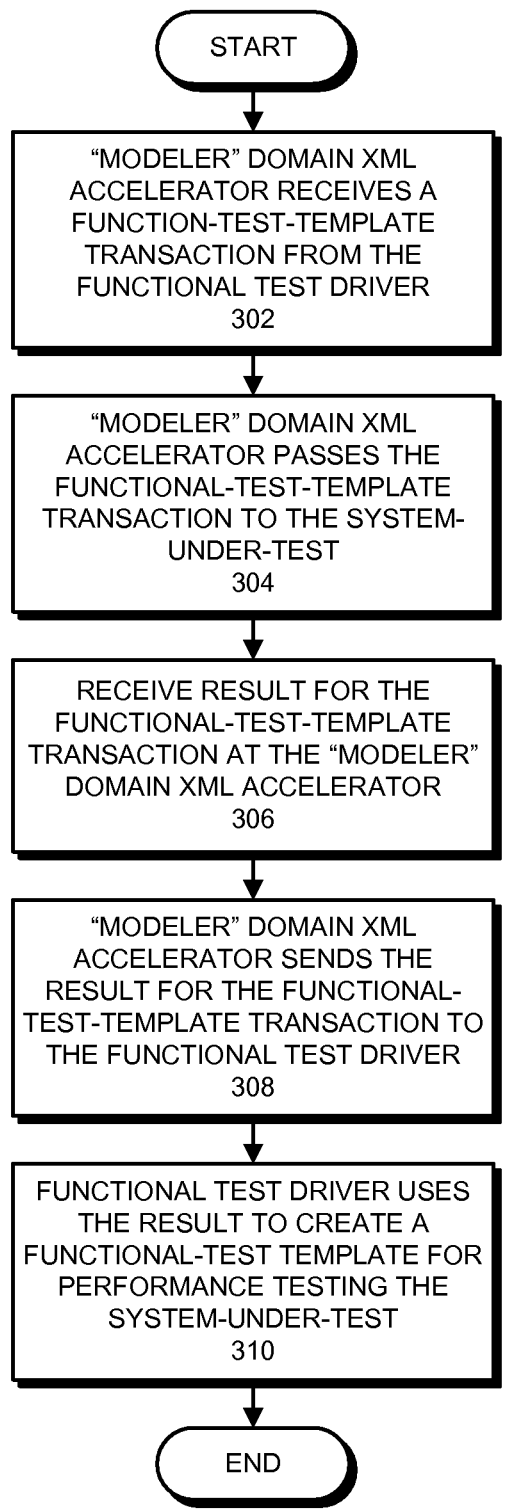
FIG. 3 presents a flowchart illustrating the process of creating a functional-test template in accordance with an embodiment of the present invention.

FIG. 3 presents a flowchart illustrating the process of creating a functional-test template in accordance with an embodiment of the present invention. During operation, "modeler" domain XML accelerator 204 receives a functional-test-template transaction from functional test driver 208 (operation 302). Note that this functional-test-template transaction may be created by any of the means described previously. For example, a process may capture the actions of a user 120 interacting with the system-under-test during normal operation to recreate functional-test templates from actual transactions performed by the user 120.

"Modeler" domain XML accelerator 204 then passes the functional-test-template transaction to system-under-test 202 (operation 304) and receives a result from system-under-test 202 (operation 306). "Modeler" domain XML accelerator 204 then sends the result back to functional test driver 208 (operation 308). Finally, the system uses the result sent to functional test driver 208 to create a functional-test template for performance testing system-under-test 202 (operation 310).

Testing a System

Figure 4:
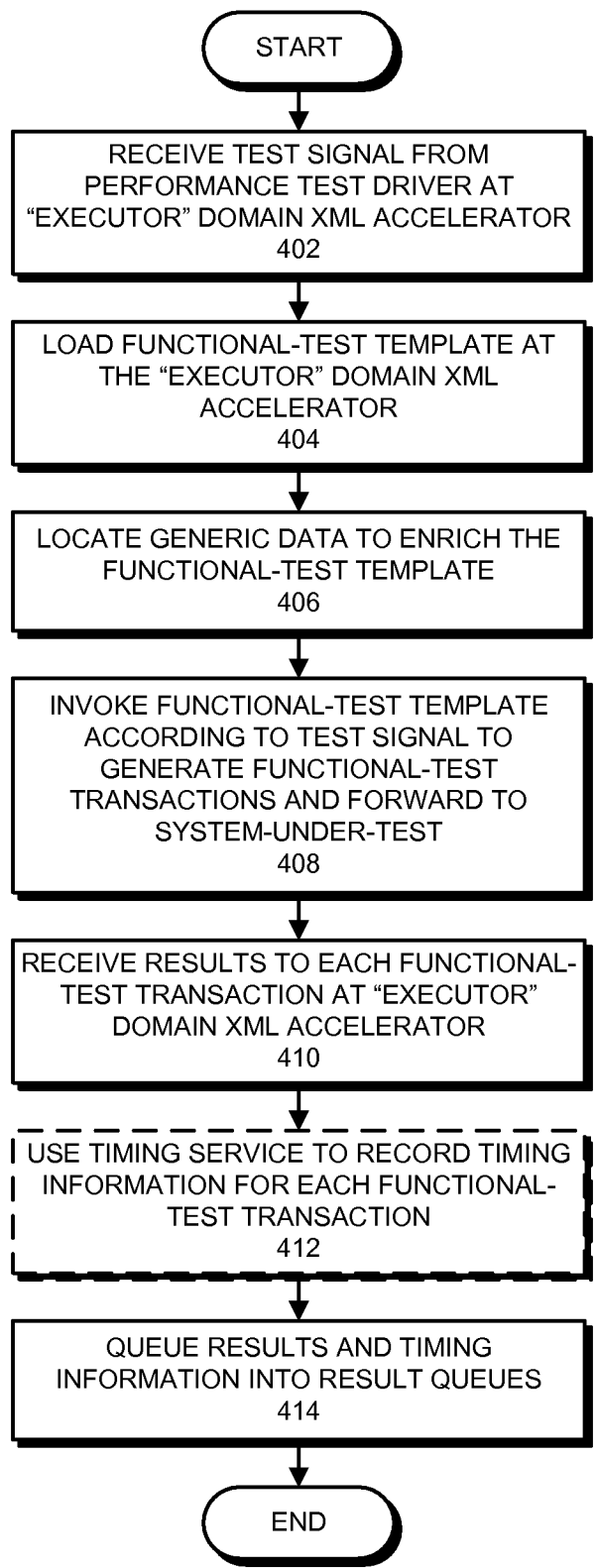
FIG. 4 presents a flowchart illustrating the process of testing the system-under-test in accordance with an embodiment of the present invention.

FIG. 4 presents a flowchart illustrating the process of testing the system-under-test 202 in accordance with an embodiment of the present invention. During operation, the system receives a test signal from performance test driver 210 at "executor" domain XML accelerator 206 (operation 402). Note that the test signal may include the name of a functional-test template to use, as well as use parameters for the functional-test template, such as number of iterations to perform the test, the source for generic data 212 to enrich the functional-test template with random data, etc. The system then loads the functional-test template at the "executor" domain XML accelerator 206 (operation 404). Note that in one embodiment of the present invention, the functional-test template is in the form of an XSLT script.

Next, "executor" domain XML accelerator 206 uses generic data 212 to enrich the functional-test template with random data (operation 406). "Executor" domain XML accelerator 206 then invokes the functional-test template according to the test signal to generate functional-test transactions to forward to system-under-test 202 (operation 408). Subsequent to sending each functional-test transaction to system-under-test 202, "executor" domain XML accelerator 206 receives a result for each functional-test transaction (operation 410).

Optionally, "executor" domain XML accelerator 206 uses timing service 214 to record timing information for each functional-test transaction (operation 412). Finally, "executor" domain XML accelerator 206 queues the results and optional timing information into result queues 216 (operation 414). Note that in some embodiments of the present invention, instead of queuing the results, "executor" domain XML accelerator 206 may forward the results to a real-time processing engine so that the results can be processed in real-time.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performance testing a system-under-test with functional-test software and a transformation accelerator, the method comprising:
   receiving a functional-test-template transaction at a first transformation accelerator from a functional test driver, wherein the functional-test-template transaction comprises plain text, and wherein the first transformation accelerator comprises an eXtensible Markup Language (XML) transformation accelerator network appliance;
   using the first transformation accelerator to create a functional-test template from the functional-test-template transaction, wherein doing so comprises:
   translating the plain text in the functional test-template transaction into an XML document;
   specifying a number of repeats based on the system-under-test;
   receiving testing parameters at a second transformation accelerator, and wherein the second transformation accelerator comprises an eXtensible Markup Language (XML) transformation accelerator network appliance;
   receiving the functional-test template at the second transformation accelerator, wherein the functional-test template is fillable with data from a source, and wherein the functional-test template, when invoked, generates one or more functional test transactions using the data;
   using the second transformation accelerator to invoke the functional-test template according to the testing parameters, wherein invoking the functional-test template comprises using XML transformations at the second transformation accelerator to create a set of functional-test transactions, wherein each functional-test transaction of the set of functional-test transactions comprises a corresponding subset of the data from the source, wherein the size of the set of functional-test transactions is based on the number of repeats, and wherein creating the functional-test transaction comprises determining the subset for the functional-test transaction based on the testing parameters and filling the functional-test template with the subset;
   sending the set of functional-test transactions to the system-under-test in parallel;
   receiving results for the set of functional-test transactions from the system-under-test; and
   queuing the results.

2. The method of claim 1, wherein the functional-test-template transaction is received from a user.

3. The method of claim 1, wherein the functional-test-template transaction is received from a process that analyzes an input of a user to the system-under-test.

4. The method of claim 1, wherein the functional-test-template transaction is received from a process that analyzes network traffic to the system-under-test.

5. The method of claim 1, wherein invoking the functional-test template at the transformation accelerator involves filling the functional-test template with data from a generic source to create the one or more functional-test transactions.

6. The method of claim 1, further comprising analyzing the queued results to determine a performance of the system-under-test.

7. The method of claim 1, further comprising:
   recording a response time from the system-under-test for each of the one or more functional-test transactions; and
   queuing the response times.

8. The method of claim 7, further comprising analyzing the queued results with the queued response times to determine a performance of the system-under-test.

9. The method of claim 1, further comprising:
   receiving a set of transformation rules governing the functional-test template at the transformation accelerator; and
   using the set of transformation rules to generate a series of test signals representing a complex workload without generating full transaction requests.

10. The method of claim 9, wherein the set of transformation rules comprises the XML transformations, and wherein the testing parameters comprise the set of transformation rules.

11. The method of claim 1, wherein the testing parameters specify a number of times to invoke the functional-test template at the transformation accelerator.

12. The method of claim 1, wherein the testing parameters specify the source.

13. The method of claim 1, wherein sending the one or more functional-test transactions to the system-under-test comprises using a separate XML transformation accelerator network appliance to send the one or more functional-test transactions in parallel to multiple destinations.

14. A non-transitory computer-readable storage medium storing instructions that when executed by a computer cause the computer to perform a method for performance testing a system-under-test with functional-test software and a transformation accelerator, the method comprising:
   receiving a functional-test-template transaction at a first transformation accelerator from a functional test driver, wherein the functional-test-template transaction comprises plain text, and wherein the first transformation accelerator comprises an eXtensible Markup Language (XML) transformation accelerator network appliance;
   using the first transformation accelerator to create a functional-test template from the functional-test-template transaction, wherein doing so comprises:
   translating the plain text in the functional test-template transaction into an XML document;
   specifying a number of repeats based on the system-under-test;
   receiving testing parameters at a second transformation accelerator, and wherein the second transformation accelerator comprises an eXtensible Markup Language (XML) transformation accelerator network appliance;
   receiving the functional-test template at the second transformation accelerator, wherein the functional-test template is fillable with data from a source, and wherein the functional-test template, when invoked, generates one or more functional test transactions using the data;
   using the second transformation accelerator to invoke the functional-test template according to the testing parameters, wherein invoking the functional-test template comprises using XML transformations at the second transformation accelerator to create a set of functional-test transactions, wherein each functional-test transaction of the set of functional-test transactions comprises a corresponding subset of the data from the source, wherein the size of the set of functional-test transactions is based on the number of repeats, and wherein creating the functional-test transaction comprises determining the subset for the functional-test transaction based on the testing parameters and filling the functional-test template with the subset;
   sending the set of functional-test transactions to the system-under-test in parallel;
   receiving results for the set of functional-test transactions from the system-under-test; and
   queuing the results.

15. The non-transitory computer-readable storage medium of claim 14, wherein the functional-test-template transaction is received from a process that analyzes an input of a user to the system-under-test.

16. The non-transitory computer-readable storage medium of claim 14, wherein the functional-test-template transaction is received from a process that analyzes network traffic to the system-under-test.

17. The non-transitory computer-readable storage medium of claim 14, wherein invoking the functional-test template at the transformation accelerator involves filling the functional-test template with data from a generic source to create the one or more functional-test transactions.

18. The non-transitory computer-readable storage medium of claim 14, wherein the method further comprises analyzing the queued results to determine a performance of the system-under-test.

19. The non-transitory computer-readable storage medium of claim 14, wherein the method further comprises:
   recording a response time from the system-under-test for each of the one or more functional-test transactions; and
   queuing the response times.

20. The non-transitory computer-readable storage medium of claim 14, wherein the method further comprises:
   receiving a set of transformation rules governing the functional-test template at the transformation accelerator; and
   using the set of transformation rules to generate a series of test signals representing a complex workload without generating full transaction requests.

21. An apparatus configured for performance testing a system-under-test with functional-test software and a transformation accelerator, the method apparatus comprising:
   a processor;
   a first receiving mechanism configured to:
      receive a functional-test-template transaction at a first transformation accelerator from a functional test driver, wherein the functional-test-template transaction comprises plain text, and wherein the first transformation accelerator comprises an eXtensible Markup Language (XML) transformation accelerator network appliance; and
      use the first transformation accelerator to create a functional-test template from the functional-test-template transaction, wherein doing so comprises:
         translating the plain text in the functional test-template transaction into an XML document; and
         specifying a number of repeats based on the system-under-test;
   receiving testing parameters at a second transformation
   a second receiving mechanism configured to receive testing parameters at a second transformation accelerator, and wherein the transformation accelerator comprises an eXtensible Markup Language (XML) transformation accelerator network appliance;
   wherein the receiving mechanism is further configured to receive the functional-test template at the second transformation accelerator, wherein the functional-test template is fillable with data from a source, and wherein the functional-test template, when invoked, generates one or more functional test transactions using the data;
   a manipulation mechanism configured to use the second transformation accelerator to invoke the functional-test template according to the testing parameters, wherein, while using the second transformation accelerator to invoke the functional-test template, the manipulation mechanism is configured to use XML transformations at the XML transformation accelerator to create a set of functional-test transactions, wherein each functional-test transaction of the set of functional-test transactions comprises a subset of the data from the source, wherein the size of the set of functional-test transactions is based on the number of repeats, and wherein, while creating the functional-test transaction, the manipulation mechanism is configured to determine the subset for the functional-test transaction based on the testing parameters and to fill the functional-test template with the subset;
   a transmission mechanism configured to send the set of functional-test transactions to the system-under-test in parallel;
   wherein the receiving mechanism is further configured to receive results for the set of functional-test transactions from the system-under-test; and
   a queuing mechanism configured to queue the results.

* * * * *